United States Patent
Ceccherini et al.

(10) Patent No.: US 11,636,419 B2
(45) Date of Patent: Apr. 25, 2023

(54) SYSTEM AND METHOD FOR PLANT EFFICIENCY EVALUATION

(71) Applicant: SIEMENS AKTIENGESELLSCHAFT, Munich (DE)

(72) Inventors: Marina Ceccherini, Genoa (IT); William Bottini, Genoa (IT); Tiziano Ferrandi, Castelldefels Bacelona (ES)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/059,277

(22) Filed: Aug. 9, 2018

(65) Prior Publication Data
US 2019/0050779 A1 Feb. 14, 2019

(30) Foreign Application Priority Data
Aug. 9, 2017 (EP) .................................. 17185521

(51) Int. Cl.
*G06F 3/04817* (2022.01)
*G06F 3/0486* (2013.01)
(Continued)

(52) U.S. Cl.
CPC ..... *G06Q 10/06393* (2013.01); *G06F 3/0482* (2013.01); *G06F 3/0486* (2013.01); *G06F 3/0488* (2013.01); *G06F 3/04817* (2013.01)

(58) Field of Classification Search
CPC ...... G06Q 10/063–06398; G06F 3/048–04897
See application file for complete search history.

(56) References Cited

U.S. PATENT DOCUMENTS

| 6,934,696 B1 * | 8/2005 | Williams | G06N 5/022 706/46 |
| 8,028,275 B2 * | 9/2011 | Eldridge | G05B 15/02 717/121 |

(Continued)

FOREIGN PATENT DOCUMENTS

| CN | 1392978 A | 1/2003 |
| CN | 103995931 A | 8/2014 |

(Continued)

OTHER PUBLICATIONS

Measure. In American Heritage's online dictionary (5th ed.). Retrieved Aug. 21, 2020 from https://ahdictionary.com/word/search.html?q=measure (Year: 2020).*

(Continued)

*Primary Examiner* — Linda Huynh
(74) *Attorney, Agent, or Firm* — Laurence A. Greenberg; Werner H. Stemer; Ralph E. Locher

(57) ABSTRACT

A method for plant efficiency evaluation includes a first step of displaying in a first graphical zone a set of operators and a set of operands in a second graphical zone. A formula editor user interface is provided in a third graphical zone which enables a drag and drop of an operator or an operand for creating a formula for a plant performance indicator (PPI) as a measure of plant efficiency. When an operand is dropped into the third graphical zone, automatically displaying for the dropped operand a predefined list of entities involved in a production process of the plant, the predefined list enabling a selection of an entity for said operand. Data are then automatically collected for selected entity for each operand that has been dragged and dropped in the third graphical zone, and the PPI is a automatically calculated from the formula and the collected data.

16 Claims, 4 Drawing Sheets

(51) Int. Cl.
*G06Q 10/0639* (2023.01)
*G06F 3/0482* (2013.01)
*G06F 3/0488* (2022.01)

(56) References Cited

U.S. PATENT DOCUMENTS

| | | | |
|---|---|---|---|
| 2002/0091991 A1 | 7/2002 | Castro | |
| 2002/0178039 A1 | 11/2002 | Kennedy | |
| 2003/0034998 A1* | 2/2003 | Kodosky | H04L 67/36 715/736 |
| 2003/0191765 A1 | 10/2003 | Bargh et al. | |
| 2005/0177269 A1* | 8/2005 | Funk | G05B 19/4187 700/121 |
| 2007/0005266 A1* | 1/2007 | Blevins | G05B 17/02 702/22 |
| 2007/0038321 A1* | 2/2007 | McDonald | G05B 17/02 703/2 |
| 2009/0064025 A1* | 3/2009 | Christ | G06Q 10/087 715/772 |
| 2009/0100360 A1* | 4/2009 | Janzen | G06F 40/18 715/764 |
| 2009/0106640 A1* | 4/2009 | Handy | G06Q 10/00 715/212 |
| 2009/0249237 A1* | 10/2009 | Jundt | G05B 19/0426 715/769 |
| 2010/0162210 A1 | 6/2010 | Briden et al. | |
| 2010/0305736 A1 | 12/2010 | Arduini | |
| 2011/0029102 A1* | 2/2011 | Campney | G05B 17/02 700/83 |
| 2011/0153051 A1* | 6/2011 | Bachman | G05B 19/41865 700/96 |
| 2012/0029661 A1* | 2/2012 | Jones | G06F 3/0484 700/17 |
| 2012/0041570 A1* | 2/2012 | Jones | G05B 19/41865 700/17 |
| 2012/0066030 A1 | 3/2012 | Limped | |
| 2013/0055128 A1 | 2/2013 | Muti et al. | |
| 2014/0379512 A1* | 12/2014 | Vallier | G06Q 30/0283 705/26.4 |
| 2015/0169532 A1* | 6/2015 | Otero | G06F 40/18 715/212 |
| 2015/0220638 A1* | 8/2015 | Motoyama | G06F 3/04847 707/722 |
| 2016/0217509 A1 | 7/2016 | Eggleston, IV et al. | |
| 2016/0292611 A1* | 10/2016 | Boe | G06Q 10/06393 |
| 2016/0306965 A1* | 10/2016 | Iyer | G06Q 10/0635 |
| 2017/0161657 A1 | 6/2017 | Barnes et al. | |
| 2017/0236067 A1* | 8/2017 | Tjiong | G05B 23/0229 706/11 |
| 2018/0109417 A1* | 4/2018 | Nixon | G05B 15/02 |
| 2018/0109955 A1* | 4/2018 | Nixon | G06F 16/2428 |

FOREIGN PATENT DOCUMENTS

| | | |
|---|---|---|
| CN | 106548322 A | 3/2017 |
| CN | 106605255 A | 4/2017 |
| EP | 2889819 A1 | 7/2015 |
| WO | 2012040674 A2 | 3/2012 |

OTHER PUBLICATIONS

National Instruments: "LabVIEW TM Getting Started with LabVIEW", Jun. 30, 2013 (Jun. 30, 2013), XP055751229 Retrieved from the Internet: URL:https://www.ni.com/pdf/manuals/373427j.pdf [retrieved on Nov. 17, 2020].

Wang Fudi et al.: "Upgrade and Transformation of Meteorological Data Service System in the State Council", Meteorological Science and Technology, vol. 40, No. 5, China Academic Journal Electronic Publishing House, Oct. 15, 2012—English abstract on last page.

Chen Heng et al.: "Research on Efficiency of Business Information Security Management from the Perspective of Information Value Chain", Library Theory and Practice No. 12, China Academic Journal Electronic Publishing House, Dec. 30, 2015.

* cited by examiner

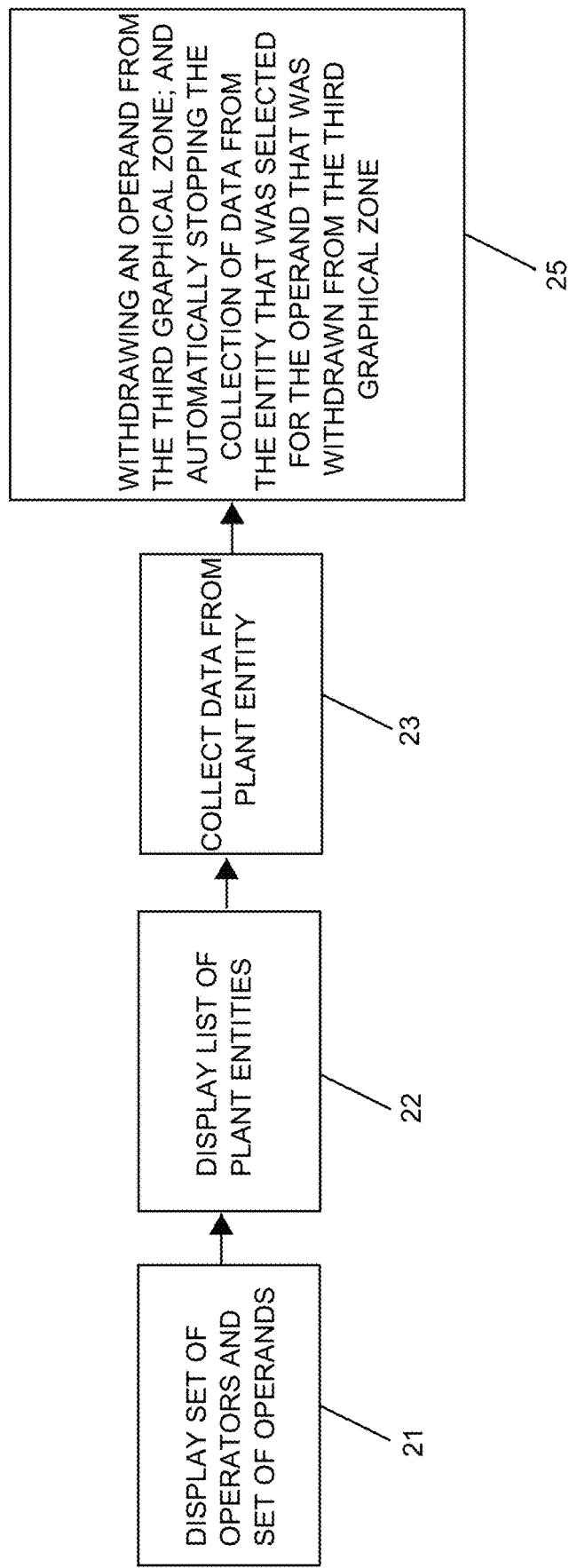

SYSTEM AND METHOD FOR PLANT EFFICIENCY EVALUATION

CROSS-REFERENCE TO RELATED APPLICATION

This application claims the priority, under 35 U.S.C. § 119, of European patent application EP 17 185 521.6, filed Aug. 9, 2017; the prior application is herewith incorporated by reference in its entirety.

BACKGROUND OF THE INVENTION

Field of the Invention

The invention lies in the field of Manufacturing Execution Systems (MES). Specifically, the invention relates to a method and a system for plant efficiency evaluation.

As defined by the Manufacturing Enterprise Solutions Association (MESA International), a manufacturing execution system (MES) "is a dynamic information system that drives effective execution of manufacturing operations," by managing "production operations from point of order release into manufacturing to point of product delivery into finished goods" and by providing "mission critical information about production activities to others across the organization and supply chain via bi-directional communication."

The functions that MESs usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

Siemens Corporation offers a broad range of MES products under its SIMATIC IT® product family.

Within this context, one issue remains the evaluation of a plant efficiency which requires a time consuming configuration of plant efficiency calculation formulas and operators to be specifically trained for this purpose.

Indeed, existing techniques either provide predefined sets of formulas for evaluating the plant efficiency or enable some flexibility by allowing a user to create new custom formulas in a kind of textual way. On one hand, the predefined sets of formulas do not offer to the user enough flexibility in the evaluation of the plant efficiency, and on the other hand, creating new custom formulas in said kind of textual way requires specific competencies and therefore specific trainings of the operator, failing therefore to provide any intuitive and easy way to enable an evaluation of a plant efficiency for any operator.

SUMMARY OF THE INVENTION

It is accordingly an object of the invention to provide a system and method for evaluating plant efficiency which overcome the above-mentioned and other disadvantages of the heretofore-known systems and methods of this general type and which facilitate the evaluation of plant efficiency and that allows an operator to intuitively and simply configure any evaluation of plant efficiency, notably within a MES.

With the foregoing and other objects in view there is provided, in accordance with the invention, a method for evaluating plant efficiency, the method comprising:

displaying in a first graphical zone a set of operators;
displaying in a second graphical zone a set of operands;
providing in a third graphical zone a formula editor user interface enabling a drag and drop of an operator, respectively of an operand, from the first graphical zone, respectively from the second graphical zone, into the third graphical zone in order to enable a user to create a formula for a plant performance indicator (PPI) configured for measuring plant efficiency, said PPI being for instance a Key Production Indicator (KPI);

for each dropping of an operand into the third graphical zone, automatically displaying for the dropped operand a predefined list of entities involved in a production process of the plant for said operand, said predefined list enabling a selection, by a user, of an entity for said operand. Preferentially, said predefined list comprises a physical address of the entity;

automatically collecting data corresponding to the selected entity for each operand that has been dragged and dropped in the third graphical zone;

automatically calculating the PPI from said formula and the collected data.

With that above and other objects in view there is also presented, in accordance with the invention, a system for evaluating plant efficiency. The novel system comprises:

a user interface comprising a first graphical zone for displaying a set of operators, a second graphical zone for displaying a set of operands, said user interface further comprising a third graphical zone enabling a drag and drop of an operator, respectively of an operand, from the first graphical zone, respectively from the second graphical zone, into the third graphical zone in order to create a formula for calculating a PPI;

a processing unit, connected to the user interface and to entities, like equipment and/or sensors and/or production devices, of the plant, the processing unit being configured for automatically displaying for each dropped operand a predefined list of said entities involved in a production process of the plant for the dropped operand, said predefined list enabling a user to select an entity for said operand, the processing unit being further configured for automatically collecting data from a selected entity for each operand that is comprised within the third graphical zone and for automatically calculating the PPI from the formula and the collected data. Preferentially, the processing unit is configured for collecting said data at a physical address of the entity, said physical address being provided in said predefined list for each entity.

The PPI thus calculated is further used, as appropriate, to either improve the efficiency of a specific entity, of the plant and/or process as a whole, or to report to plant management.

Other features which are considered as characteristic for the invention are set forth in the appended claims.

Although the invention is illustrated and described herein as embodied in a system and method for plant efficiency evaluation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is a schematic flow diagram illustrating a variant of the method according to the invention.

DETAILED DESCRIPTION OF THE INVENTION

Figure 1:
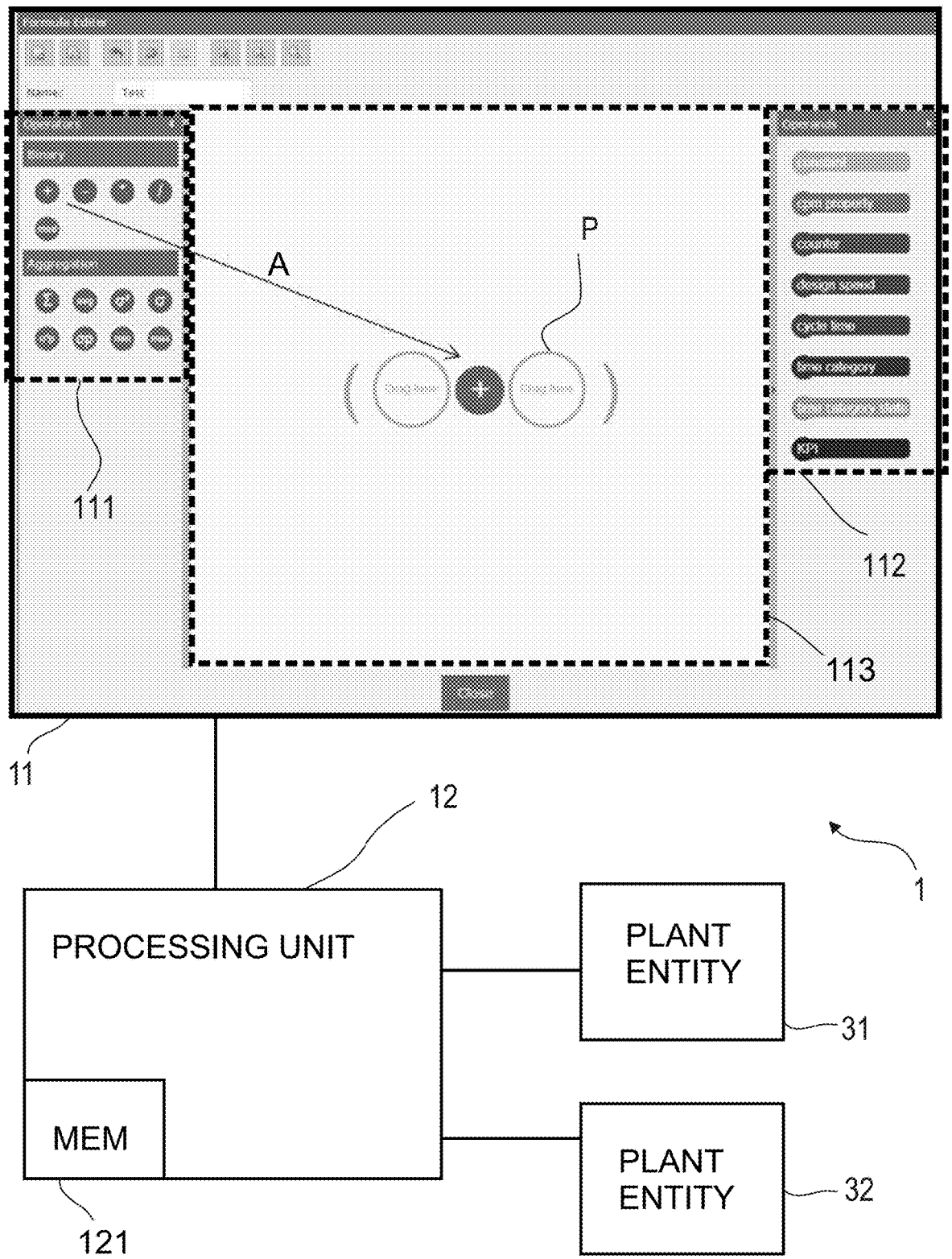
FIG. 1 shows a schematic representation of a system according to the invention.

Referring now to the figures of the drawing in detail and first, particularly, to FIG. 1 thereof, there is shown a preferred embodiment of a system 1 according to the invention.

The system 1 has a user interface 11 with a user interface display that has a first graphical zone 111 for displaying a set of operators and a second graphical zone 112 for displaying a set of operands. The user interface display further comprises a third graphical zone 113 enabling a drag and drop illustrated by the arrow A of an operator, respectively of an operand, from the first graphical zone 111, respectively from the second graphical zone 112, into the third graphical zone 113 in order to create a formula for calculating a plant performance indicator (PPI).

The user interface display, by way of example, is a touch screen that enables a user to interact with virtual objects displayed on the touch screen. The user interface 11 may also be a screen and any other device enabling the user to interact with virtual objects displayed on the screen. Preferably, the user may directly interact with the set of operators or set of operands by selecting, for instance by grabbing (e.g. by touch or mouse click), one or several of said operators or operands, and dragging and dropping it or them to the third graphical zone 113.

As is well known in the art, the operators and the operands are virtual objects that might be selected by the user for creating a PPI formula in the third graphical zone 113. In particular, for each dropping of an operand in the third graphical zone, the system 1 automatically displays a predefined list of entities for the operand. For instance, the dropping of an operand in the third graphical zone may trigger an opening of a popup, i.e. a contextual menu, which displays a predefined list of entities to be selected by a user for the operand. The third graphical zone 113 allows to associate the selected operators and entities for operands in order for the user to create a formula for the PPI. The formula might then be stored within a memory 121 of the system 1, for instance within a processing unit 12.

The processing unit 12 includes at least one processor and a memory 121. The processing unit 12 is connected to the user interface 11 and to entities 31, 32 of the plant whose efficiency has to be evaluated. According to the present invention, the processing unit 12 is in particular configured for automatically collecting, preferably in real time, data from a selected entity 31, 32 for an operand that has been dropped within the third graphical zone 113 and for automatically calculating, for instance on request of the user, the PPI from the formula and the collected data for a specific period of time, which might be for instance defined by the user.

Preferably, the system 1 according to the invention only collects data for the selected entity for a dropped operand moved from the second graphical zone 112 into the third graphical zone 113 and does not collect data for non-selected entities listed in predefined lists for the operands so that memory is spared since data unused for the calculation of the PPI are not collected. This advantageously improves the efficiency of the system. In a further preferred embodiment, a withdrawal of an operand from the third graphical zone 113 causes an automatic stop of the collection, by the processing unit 12, of data for the entity that had been selected for the withdrawn operand. The entities 31, 32 are typical plant equipment involved for instance in the production process of a product, and/or devices measuring some values in relation with the production process.

Figure 2:
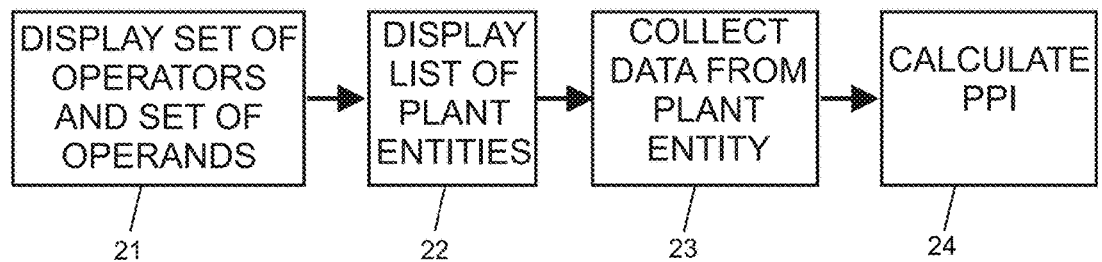
FIG. 2 is a schematic flow diagram illustrating the method according to the invention.

The method according to the invention is schematically represented by FIG. 2, wherein the system according to the invention, in particular its processing unit, is configured for carrying out the steps of the method.

In a step 21, a set of operators is displayed in a first graphical zone of a user interface display and a set of operands is displayed in a second graphical zone of the user interface display. The user interface display comprises a third graphical zone enabling the creation of a PPI formula by selecting and moving an operator, respectively an operand, from the first graphical zone, respectively from the second graphical zone, into the third graphical zone, using for instance a drag and drop function. According to the present invention, the third graphical zone is configured for enabling a user to create and/or edit a PPI formula by means of the drag and drop function applied to one or several operands and one or several operators.

A step 22 comprises automatically displaying, by way of the system and for each operand that has been dragged and dropped, i.e. selected by the user and then moved and released into the third graphical zone, a predefined list of entities for the operand. The list enables a user to select an entity of the plant for the operand.

In a step 23 data are automatically collected, notably in real time, from the selected entity for each dropped operand.

In a step 24, the PPI is automatically calculated from the formula and the collected data.

FIG. 5 shows a variant of the method shown in FIG. 2. In step 25, an interaction with the third graphical zone is performed to thereby perform a withdrawal of an operand from the third graphical zone. In response to the withdrawal of the operand from the third graphical zone, step 25 automatically stops the collection of data from the entity that was selected for the operand that was withdrawn from the third graphical zone.

Advantageously, the present invention proposes therefore an easy and intuitive graphical editor for efficiently creating and calculating a PPI for a plant by combining operands and operators within the third graphical zone. Optionally, the processing unit may comprise combination rules defined for automatically authorizing or preventing a combination of operators and operands.

Typical operators according to the invention are mathematical functions such a plus, minus, division, multiplication, but also more complex functions such as sum, power, modulo, average, minimum, maximum, etc. Typical operands according to the invention are Machine State (also called Time Category Status), Counter, Design Speed, Cycle Time, Time Category, and KPI.

A machine state operand is configured for identifying from data collected by the system for the machine state operand possible running/downtime conditions of monitored plant equipment or entity (for example: maintenance, broken sensor, reduced speed, and so on). A Time Category operand represents a group of specific statuses for a plant entity. Time Category operands are usually defined as: Running statuses and Non running statuses. It is also possible to define sub-categories for the Time Category operand, for example:

Downtime Loss, Speed Loss, Quality Loss, etc. A Design Speed operand is a measure of the speed of a piece of equipment or entity, which can be either set by the user or acquired from the field. In other words, it represents a number of pieces produced in a given time. A Cycle Time operand is the opposite of the Design Speed operand, i.e. it represents the time needed to produce a given amount of pieces. It can be predefined by the user or acquired from the field. A Counter operand is an object used to keep track of values that tend to increase. Counter operands can be used to represent the total number of items processed by a machine, or the number of "good" items produced by a specific production line. The KPI operand is a formula already configured by the user that can be reused as operand into others formulas avoiding errors. For example user can define a formula like "TotPieces=GoodPieces+ScrapPieces". Afterwards, user can use TotPieces as an operand into new formulas each time the total number of produced pieces has to be taken into account. For each operand, the processing unit according to the invention is in particular configured for automatically collecting data related to said operand from the entity to which it is connected.

Figure 3:
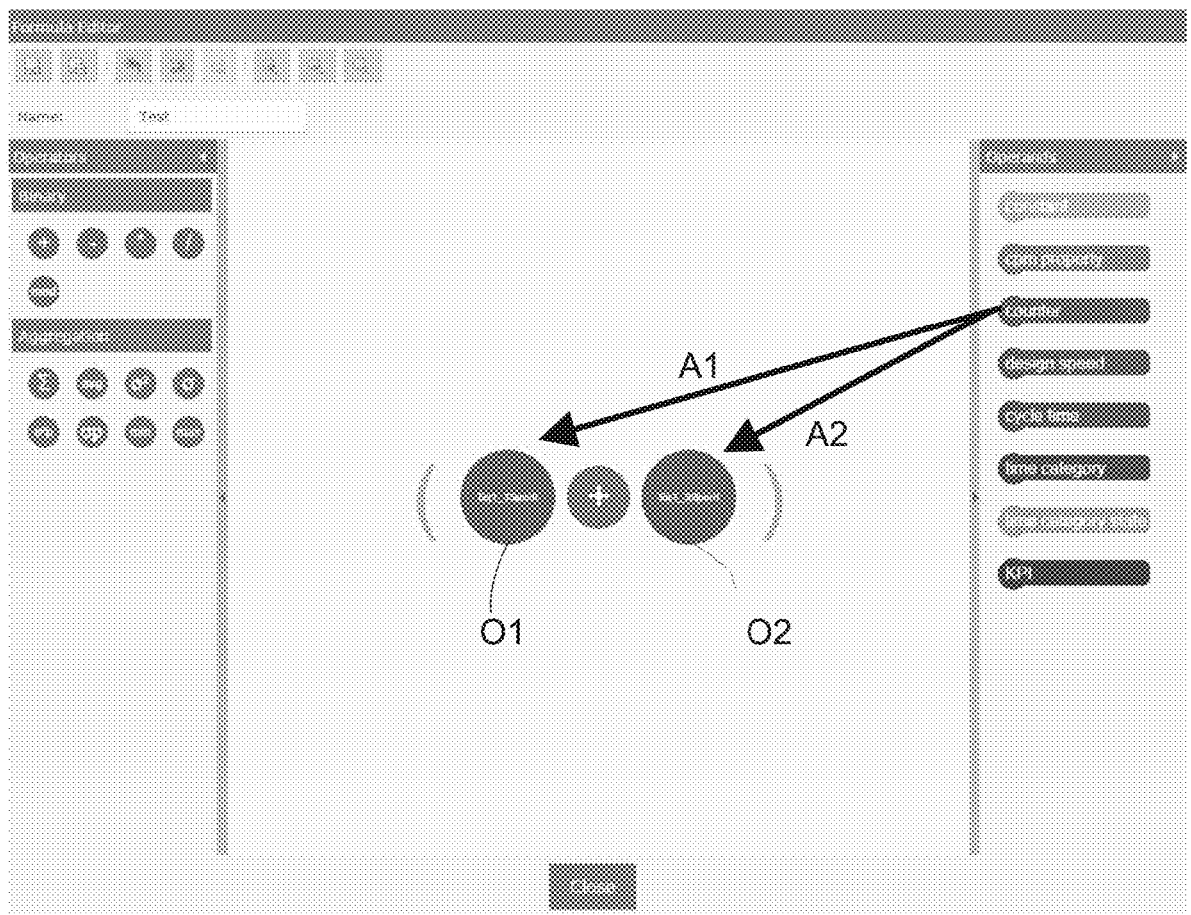
FIG. 3 shows a schematic representation of the addition of two operands.
Figure 4:
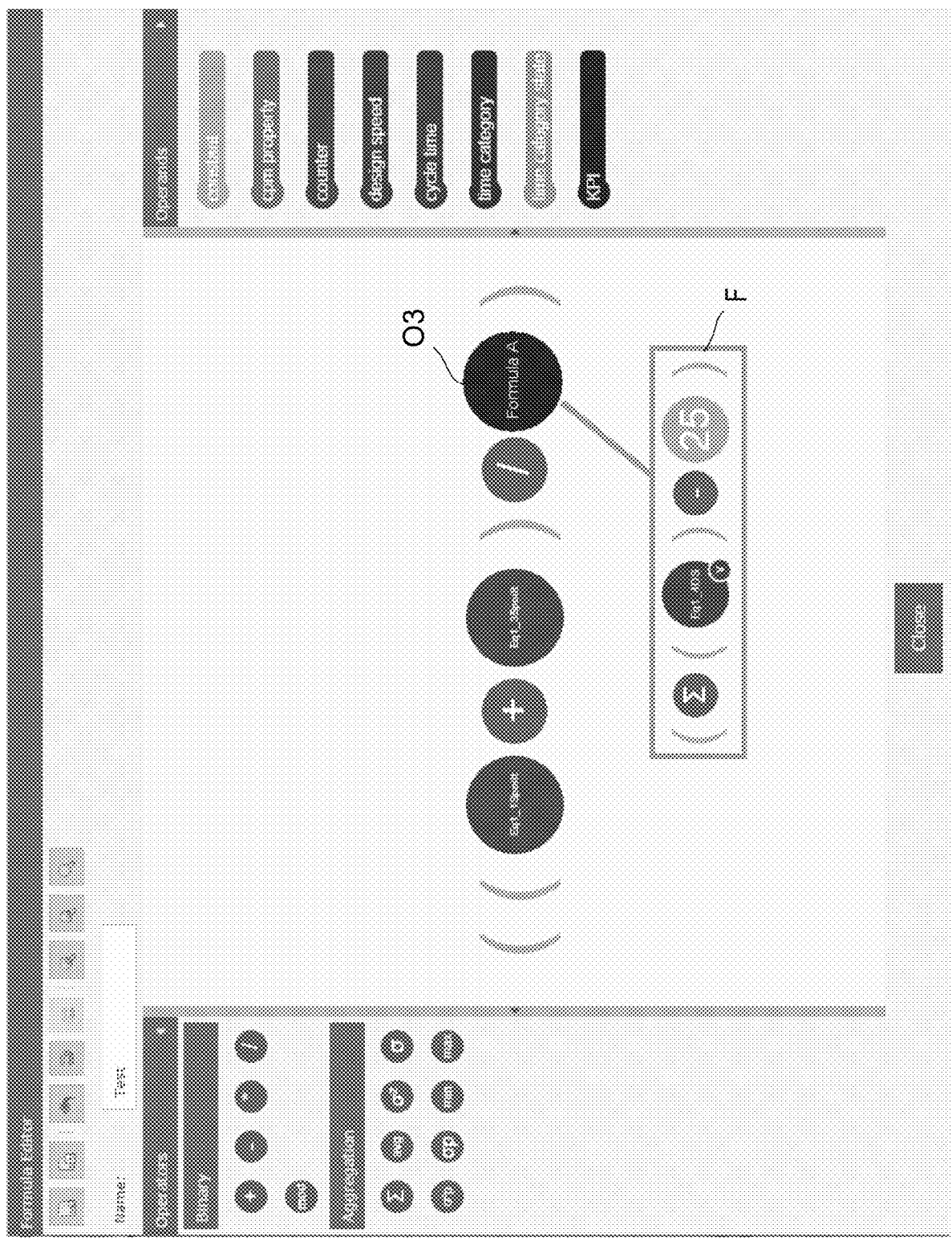
FIG. 4 shows a schematic representation of a resulting plant performance indicator formula.

According to the present invention, the predefined list associated to the dropping of each of the operands can preferentially list the same or different plant entities. Compared to the display of the user interface 11 shown in FIG. 1, FIG. 3 shows two additional operands O1 and O2 that have been added in the third graphical zone. The dropping of the two operands O1 and O2 is respectively illustrated by arrow A1 and A2. For instance, the two operands are Counter operands for two different entities of the plant and the PPI formula shown in FIG. 3 is an addition of two counters. In a further step illustrated in FIG. 4, an additional operand O3 is added to the PPI formula, wherein said additional operand O3 is a KPI operand. Optionally, the formula F for the KPI might be automatically shown below the formula for the PPI.

Optionally, placeholders P as shown in FIG. 1 may automatically appear while dragging a new operator or a new operand in the third graphical zone. Preferentially, some settings of the system according to the invention are configurable by means of a JavaScript Object Notation file, like for instance, the setting of the operators and operands in the first and second graphical zone, or rules for combining operators and operands. Finally, the created PPI formula might be stored in the memory of the processing unit or in a database of PPI formulas.

According to the present invention, each operand is in particular bound to a measurable item of data (or a quantifiable element) of an entity that has to be collected by the processing unit in order to calculate the PPI.

The invention claimed is:

1. A method for evaluating plant efficiency, the method comprising:
   providing a user interface with a first graphical zone, a second graphical zone, and a third graphical zone;
   displaying a set of operators in the first graphical zone of the user interface and a set of operands in the second graphical zone of the user interface;
   providing a formula editor user interface in the third graphical zone;
   creating a formula for a plant performance indicator (PPI) by performing, with the formula editor user interface, a drag-and-drop of an operator from the first graphical zone, or respectively of an operand from the second graphical zone, the PPI being a measure of plant efficiency;
   detecting user input for dragging and dropping respective operands and operators into the third graphical zone and, at each dropping of a given operand into the third graphical zone, automatically displaying for the given operand a predefined list of entities involved in a production process of the plant, the entities being pieces of equipment in the plant, the predefined list enabling an entity to be selected for the given operand, and detecting user input for selection of a given entity from the predefined list;
   automatically collecting, in real time from the given entity, data corresponding to the given entity for each respective operand that has been dragged and dropped in the third graphical zone and automatically calculating the PPI from the formula and the collected data; and
   performing an interaction with the third graphical zone to thereby perform a withdrawal of an operand from the third graphical zone, and in response to the withdrawal of the operand, automatically stopping the collection of data from the entity that was selected for the operand that was withdrawn from the third graphical zone, wherein the entity that was selected is one of the pieces of equipment in the plant.

2. The method according to claim 1, wherein the predefined list comprises a physical address of each entity listed in the predefined list.

3. The method according to claim 1, which comprises, in response to a dropping of an operand in the third graphical zone, opening a popup window in order to automatically display the predefined list.

4. The method according to claim 1, further comprising storing the PPI in a memory.

5. The method according to claim 1, which comprises collecting only data from the selected entity for a dropped operand, and not collecting data from unselected entities listed in the predefined list for the given operand.

6. The method according to claim 1, wherein the formula for the PPI is a mathematical formula.

7. The method according to claim 6, wherein the formula for the PPI includes operands for different entities.

8. The method according to claim 1, wherein the interaction with the third graphical zone is performed by applying a drop and drag function to the operand.

9. A system for evaluating plant efficiency, the system comprising:
   a user interface with a first graphical zone for displaying a set of operators, a second graphical zone for displaying a set of operands, and a third graphical zone configured for enabling a drag and drop of an operator from said first graphical zone, or respectively of an operand from said second graphical zone, into said third graphical zone in order to create a formula for calculating a plant performance indicator (PPI) being a measure of plant efficiency; and
   a processing unit formed by at least one processor and a memory, said processing unit, connected to said user interface and to at least one entity of the plant, said processing unit being configured for automatically displaying for each operand dropped in said third graphical zone a predefined list of entities involved in a production process of the plant in relation with said operand, the entities being pieces of equipment in the plant, said predefined list enabling a selection of an entity for said operand, and said processing unit being further configured for automatically collecting data from a selected entity, in real time, for each respective operand that has been dropped within said third graphical zone and for automatically calculating the PPI from the formula and the collected data;

wherein said processing unit is configured for automatically stopping a collection of data from an entity that was selected for an operand when the operand is withdrawn from said third graphical zone by an interaction with said third graphical zone, wherein the entity that was selected is one of the pieces of equipment in the plant.

10. The system according to claim 9, wherein said processing unit is configured for collecting the data at a physical address of each entity, said physical address being provided in said predefined list for each entity.

11. The system according to claim 9, wherein said user interface comprises a touch screen display.

12. The system according to claim 9, wherein said processing unit is configured for collecting only data from the selected entity for a dropped operand, while data from unselected entities listed in predefined lists for the operands remain uncollected.

13. The system according to claim 9, wherein said memory has the PPI stored therein.

14. The system according to claim 9, wherein the formula for the PPI is a mathematical formula.

15. The system according to claim 14, wherein the formula for the PPI includes operands for different entities.

16. The system according to claim 9, wherein the interaction with said third graphical zone is performed by applying a drop and drag function to the operand.

\* \* \* \* \*